United States Patent
Yu

(10) Patent No.: US 10,086,898 B2
(45) Date of Patent: Oct. 2, 2018

(54) MOUNTING BRACKET FOR STEPLESS VARIABLE SPEED ENGINE OF LIGHT MOTORCYCLE

(71) Applicant: Ningbo Chariot Industry Trade Co., Ltd., Ningbo (CN)

(72) Inventor: Jinjun Yu, Ningbo (CN)

(73) Assignee: NINGBO CHARIOT INDUSTRY TRADE CO., LTD., Ningbo (CN)

( * ) Notice: Subject to any disclaimer, the term of this patent is extended or adjusted under 35 U.S.C. 154(b) by 73 days.

(21) Appl. No.: 15/417,294

(22) Filed: Jan. 27, 2017

(65) Prior Publication Data

US 2018/0170475 A1    Jun. 21, 2018

(30) Foreign Application Priority Data

Dec. 15, 2016    (CN) .................. 2016 2 1376905 U

(51) Int. Cl.
*B62K 11/04*    (2006.01)
*B62M 7/02*    (2006.01)

(52) U.S. Cl.
CPC .............. *B62K 11/04* (2013.01); *B62M 7/02* (2013.01)

(58) Field of Classification Search
CPC .......... B62K 11/04; B62K 11/02; B62M 7/02; B62M 7/06
See application file for complete search history.

(56) References Cited

U.S. PATENT DOCUMENTS

| | | | | |
|---|---|---|---|---|
| 5,044,646 | A * | 9/1991 | Iiga ........................... | B62J 1/12 180/219 |
| 6,024,185 | A * | 2/2000 | Okada .................... | B62K 11/04 180/227 |
| 6,412,451 | B2 * | 7/2002 | Kuga ........................ | F01P 3/02 123/41.72 |
| 7,140,458 | B2 * | 11/2006 | Nakagawa ............... | B60K 1/04 180/65.1 |
| 7,490,688 | B2 * | 2/2009 | Yamamoto ............... | B62H 1/02 180/227 |
| 8,276,702 | B2 * | 10/2012 | Inaoka ..................... | B62J 35/00 180/219 |
| 8,899,367 | B2 * | 12/2014 | Hayashi ................... | B62J 35/00 123/519 |

* cited by examiner

*Primary Examiner* — Joseph M Rocca
*Assistant Examiner* — Michael R Stabley
(74) *Attorney, Agent, or Firm* — Foley & Lardner LLP

(57) ABSTRACT

A mounting bracket for a stepless variable speed engine of a light motorcycle includes a frame, a shock absorber, an engine holder, a power connection plate and a hanger. The engine holder includes a beam and two engine fixing rods, and one of the engine fixing rods is fixed to an end of the beam by a bolt, and the other engine fixing rod is integrally coupled to the other end of the beam. The engine fixing rod has plural installation nodes coupled with the engine, and both ends of the shock absorber are hinged with the frame and the middle of the beam. The power connection plate is coupled to the engine fixing rod and has a shaft hole corresponsive with a shaft of the engine. The bolt is provided for fixing and adjusting the structural form of the engine fixing rod to facilitate adjusting the interval of the engine holder to provide a convenient and accurate installation. The bolt is provided for fixing and adjusting the structural form of the engine fixing rod to facilitate adjusting the interval of the holder to provide a convenient and accurate installation.

5 Claims, 4 Drawing Sheets

MOUNTING BRACKET FOR STEPLESS VARIABLE SPEED ENGINE OF LIGHT MOTORCYCLE

FIELD OF INVENTION

The present invention relates to the technical field of motorcycles, in particular to a mounting bracket for a stepless variable speed engine of a light motorcycle.

CROSS-REFERENCE TO RELATED PATENT APPLICATIONS

This application claims the benefit of and priority to Chinese Patent Application No. 201621376905.X, filed Dec. 15, 2016, the disclosure of which is incorporated by reference herein in its entirety.

BACKGROUND OF INVENTION

1. Description of the Related Art

Most engines for motorcycles are continuously variable transmission (CVT) engines which are connected to wheels of the motorcycle directly, and the stepless speed variable engine is connected to a motorcycle frame through a shock absorber and used to improve the comfort of motorcycle riders, but the housing of the engine may be damaged easily by vibration, and the performance and service life of the engine are reduced. In addition, an engine mounting bracket is provided for connecting the engine and shock absorber, so as to prevent damaging the engine. However, the engine mounting bracket is in form of one piece, so that the installation of the engine is inconvenient. In addition, a hanger connected between the motorcycle frame and the engine mounting bracket is not restricted, so that the hanger may hit and damage the engine easily when the motorcycle encounters a large vibration.

2. Summary of the Invention

In view of the aforementioned drawbacks of the prior art, the inventor of the present invention based on years of experience in the related industry to conduct extensive research and experiment, and finally developed a mounting bracket for a stepless variable speed engine of a light motorcycle in accordance with the present invention to overcome the drawbacks of the prior art.

Therefore, it is a primary objective of the present invention to overcome the drawbacks of the prior art and provide a mounting bracket for a stepless variable speed engine of a light motor cycle with the effects of providing a convenient installation and preventing the engine from being damaged easily.

To achieve the aforementioned and other objectives, the present invention provides a mounting bracket for a stepless variable speed engine of a light motorcycle, comprising a frame, a shock absorber, an engine holder, a power connection plate and a hanger, characterized in that the engine holder includes a beam and two engine fixing rods; one of the engine fixing rods is fixed to an end of the beam by a bolt, and the other engine fixing rod is integrally formed and coupled to the other end of the beam; the engine fixing rod includes a plurality of installation nodes coupled to an engine; both ends of the shock absorber are hinged to the middle of the frame and the beam; the power connection plate is coupled to the engine fixing rod, and the power connection plate has a shaft hole coupled to a shaft of the engine.

Wherein, the hanger is installed to the bottom of the engine and movably hinged with the frame, and the frame has a limit sleeve installed thereon, and the hanger has a bump formed thereon and coupled to the corresponsive limit sleeve, and the limit sleeve has a cushion installed therein.

Wherein, the mounting bracket further comprises a first limit rod installed and hinged between the frame and the hanger, and a rubber pad installed to the hinged positions at both ends of the first limit rod.

Wherein, the hanger is installed at an upper end of the engine, disposed at a lower end of the shock absorber, and movably hinged with the frame and the engine holder, and a second limit rod is installed and hinged between the frame and the hanger, and a rubber pad is installed to the hinged positions at both ends of the second limit rod.

Wherein, the shock absorber is a telescopic rod of a belt spring, and the spring is sheathed on the telescopic rod and limited and installed between both ends of the telescopic rod and a stop plate.

Compared with the prior art, the present invention connects the engine fixing rod to the beam by the bolt to form the engine holder, and the bolt can be used to adjust the interval of the engine holder to achieve the effects of a convenient and accurate installation. The hanger installed at the bottom of the engine is applicable for an installation of an engine for 50 cc motorcycles or below, and the additional installation of the first limit rod can effectively prevent a too-large activity range of the hanger in a bumpy riding condition of the motorcycle, so as to prevent damaging the engine. In addition, the hanger installed at the top of the engine is applicable for 50 cc motorcycles or above. Since the engine of such motorcycles is relatively larger, and the aforementioned design has the effects of effectively utilizing space and reducing volume, so as to minimize the size of a large power motorcycle appropriately.

DESCRIPTION OF THE PREFERRED EMBODIMENTS

The above and other objects, features and advantages of this disclosure will become apparent from the following detailed description taken with the accompanying drawings.

Figure 1:
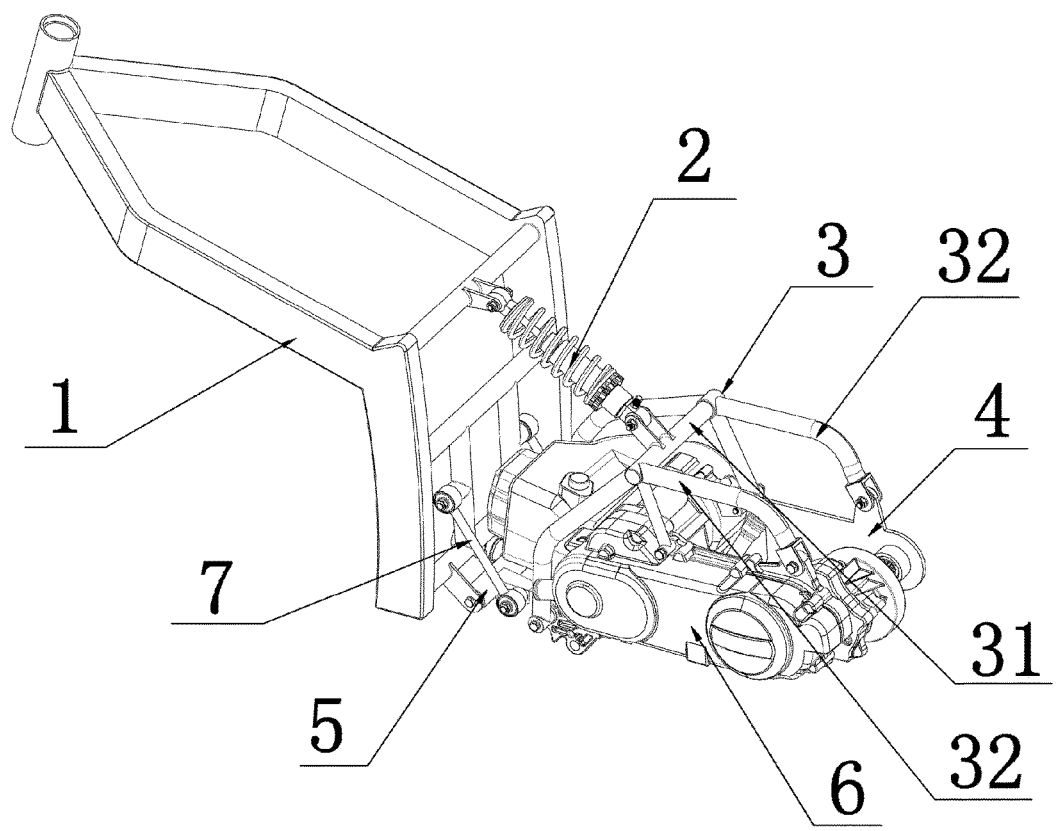
FIG. 1 is a schematic view of a mounting bracket for a belt driven engine in accordance with the present invention.
Figure 2:
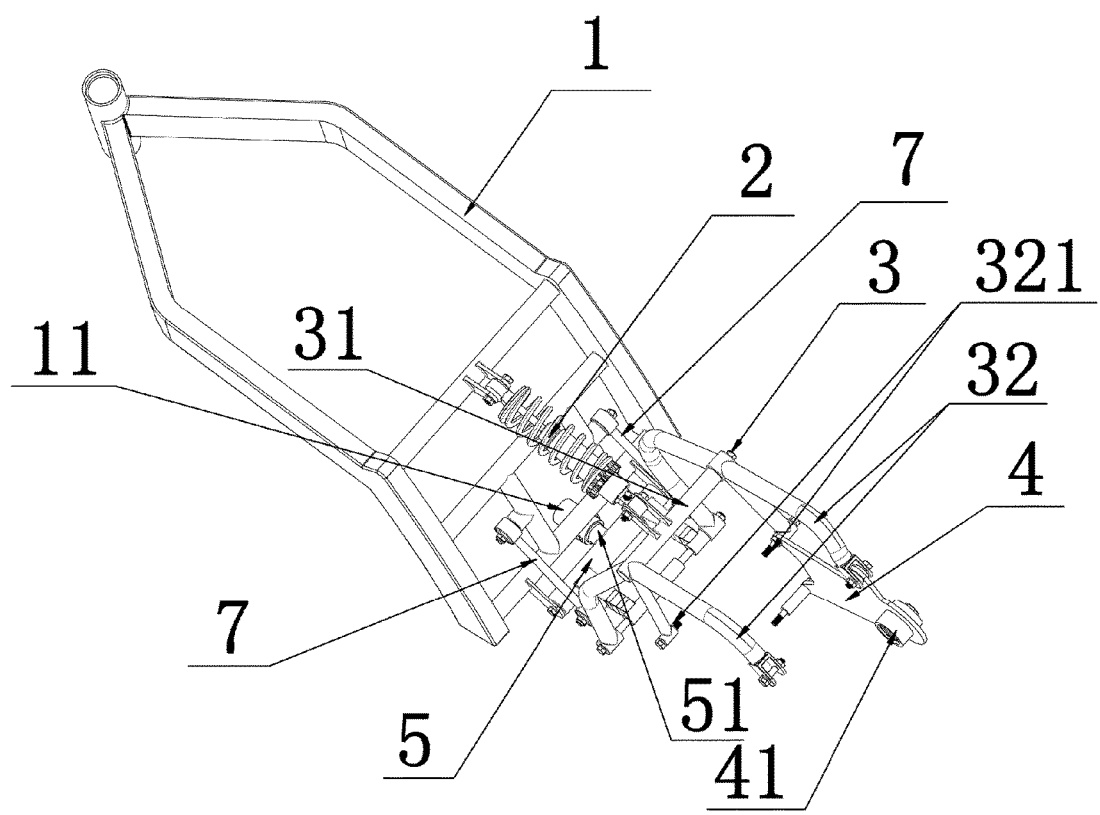
FIG. 2 is a schematic view of a mounting bracket for a stepless variable speed engine of a light motorcycle in accordance with the present invention.
Figure 3:
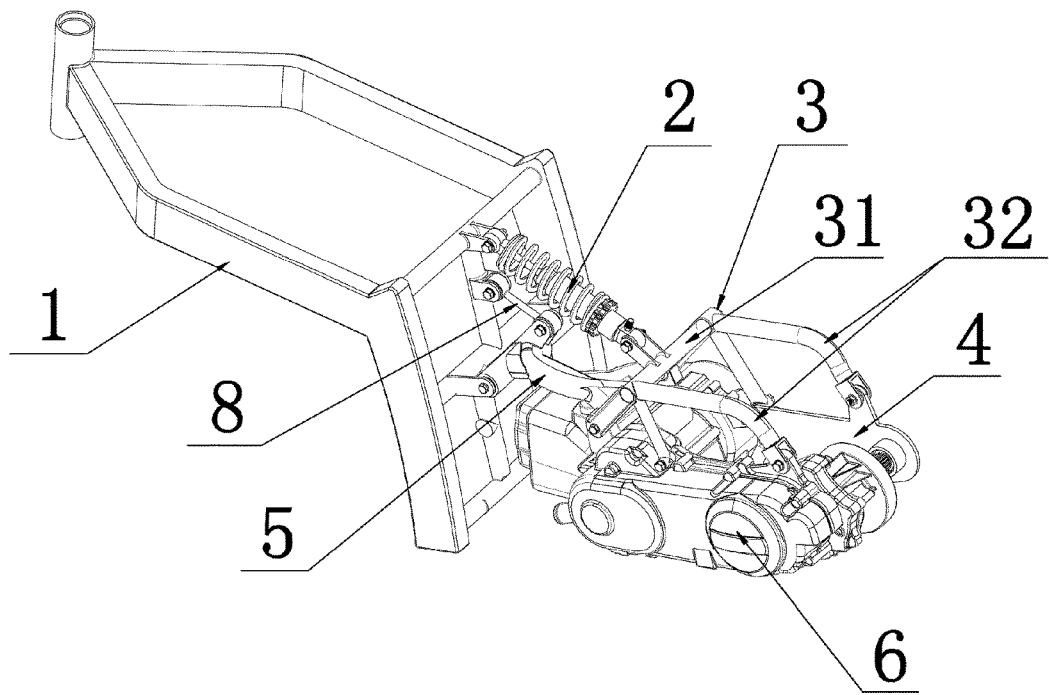
FIG. 3 is a schematic view of an optimized mounting bracket of a belt driven engine in accordance with the present invention.
Figure 4:
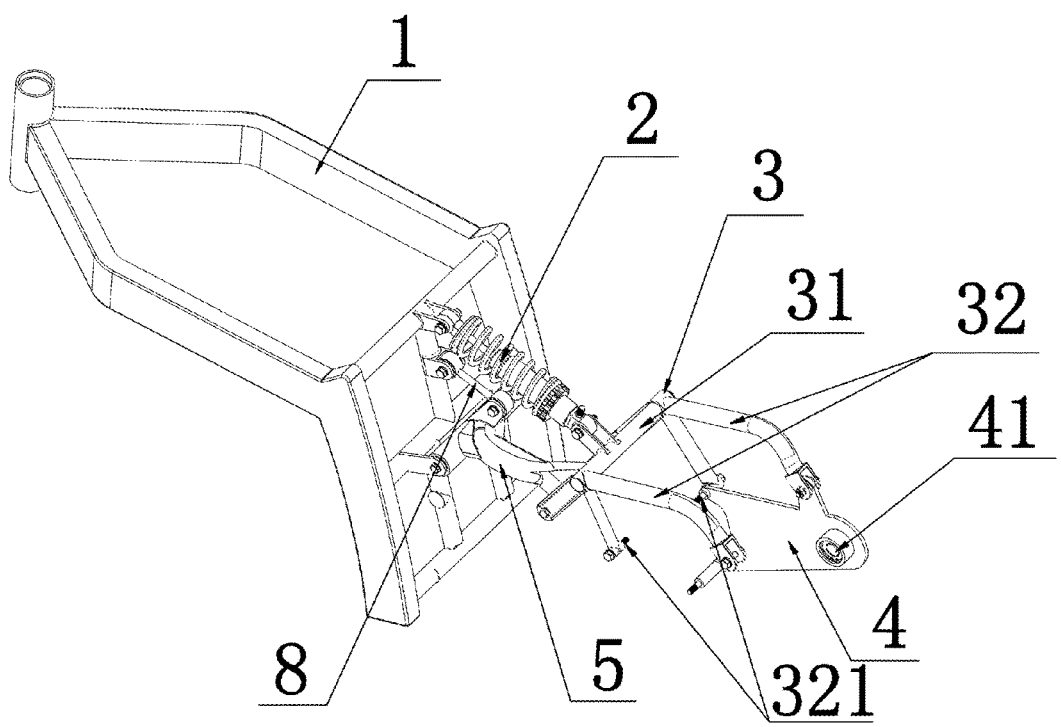
FIG. 4 is a schematic view of an optimized mounting bracket for a stepless variable speed engine of a light motorcycle in accordance with the present invention.

With reference to FIG. 1 for a schematic view of a mounting bracket for a belt driven engine in accordance with the present invention, an engine of a 50 cc motorcycle or below is installed to a mounting bracket for a stepless variable speed engine of a light motorcycle. With reference to FIG. 2 for a schematic view of a mounting bracket for a stepless variable speed engine of a light motorcycle in accordance with the present invention, a mounting bracket of an engine installed to a 50 cc motorcycle or below comprises a frame 1, a shock absorber 2, an engine holder 3, a power connection plate 4 and a hanger 5 and their connecting relation is shown in the figure. With reference to FIG. 3 for a schematic view of an optimized mounting bracket of a belt driven engine in accordance with the present invention, an engine of a 50 cc motorcycle or above is installed to a mounting bracket for a stepless variable speed engine of a light motorcycle. With reference to FIG. 4 for a schematic view of an optimized mounting bracket for a stepless variable speed engine of a light motorcycle in accordance with the present invention, the mounting bracket is used for installing an engine for a 50 cc motorcycle or above.

With reference to FIGS. 1 and 2 for the structure of a mounting bracket for a stepless variable speed engine of a light motorcycle in accordance with the present invention, the mounting bracket comprises a frame 1, a shock absorber 2, an engine holder 3, a power connection plate 4 and a hanger 5. The engine holder 3 includes a beam 31 and two engine fixing rods 32, wherein one of the engine fixing rods 32 is fixed to an end of the beam 31 by a bolt, and the other engine fixing rod 32 is integrally coupled to the other end of the beam 31. The engine fixing rod 32 has a plurality of installation nodes 321 disposed thereon and coupled to the engine 6. Both ends of the shock absorber 2 are hinged with the frame 1 and the middle of the beam 31. The power connection plate 4 and the engine fixing rod 32 are coupled and configured to be corresponsive to one another, and the power connection plate 4 has a shaft hole 41 coupled to a shaft of the engine 6. In the present invention, the bolt is provided for coupling the engine fixing rod to the beam to form the engine holder, so that the bolt can be used to adjust the interval of the engine holder to achieve a convenient an accurate installation. Since the engine is made of aluminum, therefore if the engine holder is in form of a whole piece, then it will be necessary to adjust the interval of the engine holder by hitting in order to fit the installation of the engine. The engine may be damaged easily during its installation process. In addition, the two engine fixing rods of the engine holder are coupled to both ends of the beam respectively by bolts, so that the interval of the engine holder can be adjusted more flexibly.

In this embodiment as shown in FIGS. 1 and 2, the hanger 5 is installed at the bottom of the engine 6 and movably hinged to the frame 1. The engine holder 3, and the frame 1 has a limit sleeve 11, and the hanger 5 has a bump coupled to the limit sleeve 11. The limit sleeve 11 has a cushion installed therein. In the present invention, the hanger installed at the bottom of the engine is applicable for the installation of an engine of a 50 cc motorcycle or below.

In this embodiment as shown in FIGS. 1 and 2, a first limit rod 7 is installed and hinged between the frame 1 and the hanger 5, and a rubber pad is installed to the hinged position at both ends of the first limit rod 7. The additionally installed first limit rod the present invention can effectively prevent a too-large activity range of the hanger in a bumpy riding condition of the motorcycle, wherein the rubber pad installed to the hinged position of the first limit rod can effectively absorb the shocks caused by the bumpy riding condition.

In this embodiment as shown in FIGS. 3 and 4, the hanger 5 of this embodiment, hanger 5 is installed at an upper end of the engine 6, and the hanger 5 is disposed at a lower end of the shock absorber 2, and the hanger 5 is movably hinged with the frame 1 and the engine holder 3, and a second limit rod 8 is installed and hinged between the frame 1 and the hanger 5, and a rubber pad is installed at the hinged positions at both ends of the second limit rod 8. The hanger installed to the top of the engine 6 is applicable for the engine of a 50 cc motorcycle or above. Since the volume of such engine is relatively large, such design effectively utilize the space and reduce the volume, so that the size of a large-power motorcycle can be minimized appropriately. In addition, the second limit rod can effectively limit the activity range of the hanger to prevent a too-large activity range of the hanger during a bumpy riding condition, so as to prevent damaging the engine. In addition, the rubber pad installed at the hinged position of the second limit rod can absorb the shocks caused by the bumpy riding condition.

In this embodiment as shown in FIGS. 2 and 4, the shock absorber 2 is a telescopic rod of a belt spring, and the spring is sheathed on the telescopic rod and limited and installed between both ends of the telescopic rod and a stop plate. The present invention with the aforementioned structure provides a simple, easy, and practical application.

While the invention has been described by means of specific embodiments, numerous modifications and variations could be made thereto by those skilled in the art without departing from the scope and spirit of the invention set forth in the claims.

What is claimed is:

1. A mounting bracket for a stepless variable speed engine of a motorcycle, comprising a frame, a shock absorber, an engine holder, a power connection plate and a hanger, characterized in that the engine holder includes a beam and two engine fixing rods; one of the engine fixing rods is fixed to an end of the beam by a bolt, and the other engine fixing rod is integrally formed and coupled to the other end of the beam; each of the engine fixing rods includes an installation node coupled to an engine; one end of the shock absorber is hinged to the middle of the frame and another end of the shock absorber is hinged to the beam; the power connection plate is coupled to at least one of the engine fixing rods, and the power connection plate has a shaft hole coupled to a shaft of the engine.

2. The mounting bracket for a stepless variable speed engine of a motorcycle according to claim 1, wherein the hanger is installed to the bottom of the engine and movably hinged with the frame, and the frame has a limit sleeve installed thereon, and the hanger has a bump formed thereon and coupled to the corresponsive limit sleeve, and the limit sleeve has a cushion installed therein.

3. The mounting bracket for a stepless variable speed engine of a motorcycle according to claim 2, further comprising a first limit rod installed and hinged between the frame and the hanger, and a rubber pad installed to the hinged positions at both ends of the first limit rod.

4. The mounting bracket for a stepless variable speed engine of a motorcycle according to claim 1, wherein the hanger is installed at an upper end of the engine, disposed at a lower end of the shock absorber, and movably hinged with the frame and the engine holder, and a second limit rod is installed and hinged between the frame and the hanger, and a rubber pad is installed to the hinged positions at both ends of the second limit rod.

5. The mounting bracket for a stepless variable speed engine of a motorcycle according to claim 1, wherein the shock absorber is a telescopic rod, and the spring is sheathed on the telescopic rod and limited and installed between both ends of the telescopic rod and a stop plate.

* * * * *